United States Patent
Hensley et al.

(10) Patent No.: US 10,755,383 B2
(45) Date of Patent: Aug. 25, 2020

(54) MULTI-SPACE RENDERING WITH CONFIGURABLE TRANSFORMATION PARAMETERS

(71) Applicant: Apple Inc., Cupertino, CA (US)

(72) Inventors: Justin A. Hensley, Mountain View, CA (US); Karl D. Mann, Geneva, FL (US); Ralph C. Taylor, Deland, FL (US); Randall R. Rauwendaal, San Jose, CA (US); Jonathan M. Redshaw, St Albans (GB)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 16/130,265

(22) Filed: Sep. 13, 2018

(65) Prior Publication Data
US 2019/0102865 A1    Apr. 4, 2019

Related U.S. Application Data

(60) Provisional application No. 62/565,415, filed on Sep. 29, 2017.

(51) Int. Cl.
G06T 3/40 (2006.01)
G06T 15/40 (2011.01)
(Continued)

(52) U.S. Cl.
CPC ............ *G06T 3/4084* (2013.01); *G06F 3/013* (2013.01); *G06F 30/30* (2020.01); *G06T 15/005* (2013.01);
(Continued)

(58) Field of Classification Search
CPC ..... G06T 3/4084; G06T 15/60; G06T 15/005; G06T 2210/12; G06F 17/5045; G06F 3/013; G06F 2217/12
See application file for complete search history.

(56) References Cited

U.S. PATENT DOCUMENTS

| 6,717,578 | B1 | 4/2004 | Deering |
| 9,607,428 | B2 | 3/2017 | Li |

(Continued)

FOREIGN PATENT DOCUMENTS

TW    201539372    10/2015

OTHER PUBLICATIONS

NVIDIA GeForce GTX 1080, Gaming Perfected, Whitepaper, 2016, 52 pages.

(Continued)

*Primary Examiner* — Syed Haider
(74) *Attorney, Agent, or Firm* — Kowert, Hood, Munyon, Rankin & Goetzel, P.C.

(57) ABSTRACT

Techniques are disclosed relating to rendering graphics objects. In some embodiments, a graphics unit is configured to transform graphics objects from a virtual space into a second space according to different transformation parameters for different portions of the second space. This may result in sampling different portions of the virtual space at different sample rates, which may reduce the number of samples required in various stages of the rendering process. In the disclosed techniques, transformation may occur prior to rasterization and shading, which may further reduce computation and power consumption in a graphics unit, improve image quality as displayed to a user, and/or reduce bandwidth usage or latency of video content on a network. In some embodiments, a transformed image may be viewed through a distortion-compensating lens or resampled prior to display.

17 Claims, 13 Drawing Sheets

(51) Int. Cl.
*G06F 30/30* (2020.01)
*G06F 3/01* (2006.01)
*G06T 15/00* (2011.01)
*G06T 15/60* (2006.01)
*G06F 119/18* (2020.01)

(52) U.S. Cl.
CPC .............. *G06T 15/40* (2013.01); *G06T 15/60* (2013.01); *G06F 2119/18* (2020.01); *G06T 2210/12* (2013.01)

(56) References Cited

U.S. PATENT DOCUMENTS

| | | | |
|---|---|---|---|
| 2008/0309660 A1 | 12/2008 | Bertolami et al. | |
| 2010/0188404 A1* | 7/2010 | Tong | G06T 11/40 345/426 |
| 2011/0122130 A1 | 5/2011 | Vesely et al. | |
| 2014/0267232 A1* | 9/2014 | Lum | G06T 19/20 345/419 |
| 2015/0287158 A1* | 10/2015 | Cerny | G09G 5/14 345/553 |
| 2015/0287166 A1 | 10/2015 | Cerny | |
| 2016/0260251 A1 | 9/2016 | Stafford et al. | |
| 2017/0061693 A1 | 3/2017 | Kohler et al. | |
| 2017/0124760 A1 | 5/2017 | Murakawa et al. | |
| 2017/0323475 A1* | 11/2017 | Moreton | G06T 15/80 |

OTHER PUBLICATIONS

International Search Report and Written Opinion in Appl. No. PCT/US2018/051325 dated Dec. 14, 2018, 11 pages.
John Vince, Chapter 9 Geometric Transforms in "Mathematics for Computer Graphics," Jan. 1, 2017, Springer London, XP055534176, ISSN: 1863-7310 ISBN: 978-1-4471-7336-6, the whole document.

* cited by examiner

Transformation Parameters Data Structure 500

Table 510A x1
Scale 2
Offset 0.5 x2
Scale 2
Offset 1 y
Scale 2
Offset 0.5

...

Table 510Z x1
Scale 3
Offset 1 x2
Scale 3
Offset .5 y
Scale 2
Offset 0.5

*FIG. 5*

The 2:1 transform in Portion A has a higher sampling rate and resolution relative to the 2.5:1 transform in Portion B.

MULTI-SPACE RENDERING WITH CONFIGURABLE TRANSFORMATION PARAMETERS

This application claims the benefit of U.S. Provisional Application No. 62/565,415, filed on Sep. 29, 2017, which is incorporated by reference herein in its entirety.

BACKGROUND

Technical Field

This disclosure relates generally to graphics processors and more specifically to techniques for rendering graphics objects.

Description of the Related Art

Graphics processors (GPUs) are often included in mobile devices such as cellular phones, wearable devices, etc., where power consumption and processor area are important design concerns. Modern graphics processors employ a number of techniques to facilitate rendering of graphics objects with greater speed, less power consumption, and/or less processing hardware. As an example, graphics processing often involves executing the same instruction in parallel for different graphics elements (e.g., pixels or vertices). Further, as the same group of graphics instructions is often executed multiple times (e.g., to perform a particular function for different graphics elements or for the same graphics elements at different times), the number of graphics elements processed drives computation time, power consumption, and hardware needs in graphics processors.

Speaking generally, vertex tasks and pixel tasks encompass a substantial portion of graphics processing. Vertex processing involves the use of polygons to represent images, where vertices define the polygons. The output of vertex processing is typically rasterized to generate fragment information which is operated on by pixel/fragment shaders to generate pixel data for output to a display. Reducing the amount of vertex and/or pixel data processed typically increases performance and/or reduces power consumption in a graphics unit.

BRIEF DESCRIPTION OF THE DRAWINGS

FIG. 5 is a diagram illustrating exemplary data structures configured to store transformation parameters, according to some embodiments.

Figure 1:
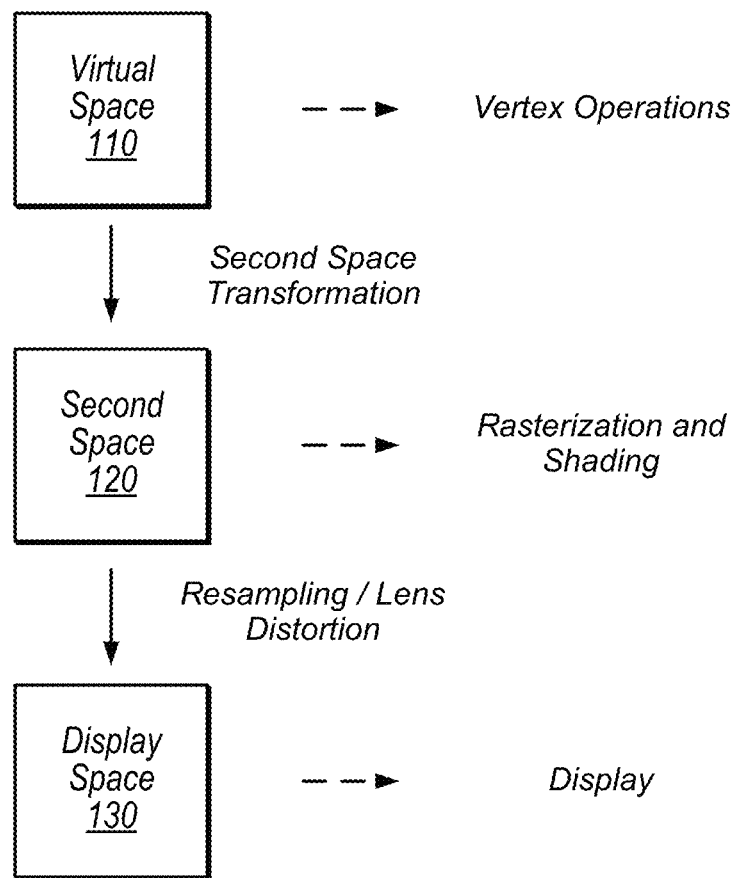
FIG. 1 is a block diagram illustrating exemplary transformation of graphics primitives between different spaces, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "shader circuit configured to process fragment data" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Transformation of Graphics Primitives

FIG. 1 is a diagram illustrating transformation of graphics primitives between different spaces utilized by a graphics unit. As used herein, the term "space" refers to one or more dimensions defined according to a coordinate system (e.g. cartesian, cylindrical, spherical). For example, a virtual scene space may be three-dimensional but may be mapped to a two-dimensional screen space for display, based on a point of view for the scene. As used herein the terms "primitive" refers to simple geometric objects that a graphics unit is configured to handle, e.g., lines, triangles, other types of polygons, curves, etc. Triangles are discussed herein in various examples, but are not intended to limit the shape of primitives used in other embodiments.

In some embodiments, virtual space 110 corresponds to a scene of one or more dimensions containing graphics primitives. In some embodiments, virtual space 110 may be used to organize primitive data, e.g., based on coordinates of primitives, received by a graphics shader from a program or process external to the shader. Virtual space 110 may contain any number of graphics primitives for rendering into a graphics display. In some embodiments, certain types of graphics processing operations manipulating primitive or vertex data are performed using coordinates of virtual space 110 (e.g. tessellation, lighting, etc.). Graphics primitives in virtual space 110 may be defined based on spatial coordinates in the virtual space 110 as well as additional data associated with a primitive (e.g. opacity of the primitive, one or more textures associated with the primitive, etc.).

In the embodiment illustrated in FIG. 1, a graphics unit transforms coordinates of primitives in virtual space 110 into coordinates of primitives in second space 120. In some embodiments, the transformation (which may also be referred to as a translation) "warps" the scene such that different portions of the virtual space are sampled with different sampling rates. Thus, the second space may be referred to as a warp space. This may reduce shader processing needed for undersampled portions of the virtual space, which may increase performance and/or reduce power consumption. In some embodiments, the graphics unit may use different transformation parameters for different portions of the second space. For example, in one portion of second space 120, primitives may be reduced in size (relative to virtual space 110) by 3x in the x-dimension, and in another portion of second space 120, primitives may be reduced in size by 2x in the y-dimension. In some embodiments, transformation of an image from virtual space 110 to second space 120 may distort part or all of the image (e.g. the relative size of various primitives in the image changes due to transformation).

In some embodiments, the graphics unit rasterizes primitives and shades fragment data resulting from rasterization in second space 120 (i.e. after transformation). Rasterizing in second space 120 at a uniform sample rate after transformation may effectively sample different portions of virtual space 110 at different rates, with the different sampling rates in virtual space corresponding to the different transformation parameters. Rasterization may generate fragment data based on coordinates of primitives in the second space. For example, a square primitive may be transformation from coordinates (0,0), (0,2), (2,2), (2,0) in virtual space 110 to coordinates (0,0), (0,1), (1,1), (1,0) in second space 120, and rasterization applying a pixel per integer coordinate may generate one fragment for each of the four corners of the square in second space 120 (as opposed to generating nine fragments covering the square if virtual space coordinates had been used). In this example, the graphics unit would shade four fragments in second space 120, rather than nine in virtual space 110, to represent the same primitive. More detailed examples of this concept are discussed below with reference to FIGS. 6 and 7.

In some embodiments, display space 130 is a space in which rendered graphics images are displayed (or sent for display) to a user (e.g., a graphics frame sent to a screen for display). Other examples of display space 130 include 3D displays such as holographic and volumetric displays. Traditionally, a graphics processor may create an image for display in display space 130 by rasterizing primitives in virtual space 110. In the embodiment illustrated in FIG. 1, by contrast, images in second space 120 rasterizing and shading occurs in second space 120). In some embodiments, an image in second space 120 may be displayed without modification (i.e. second space 120 and display space 130 are identical). In other embodiments, resampling or lens distortion may convert an image in second space 120 into display space 130. For example, viewing an image in second space 120 through a lens may correct the distortion introduced by transformation to the second space, such that the user views an undistorted image in display space 130. Note that rendered images (e.g., stored in a frame buffer) may be fed back into the GPU pipeline, in some embodiments, for further processing, which may include transformation into other spaces.

Figure 2A:
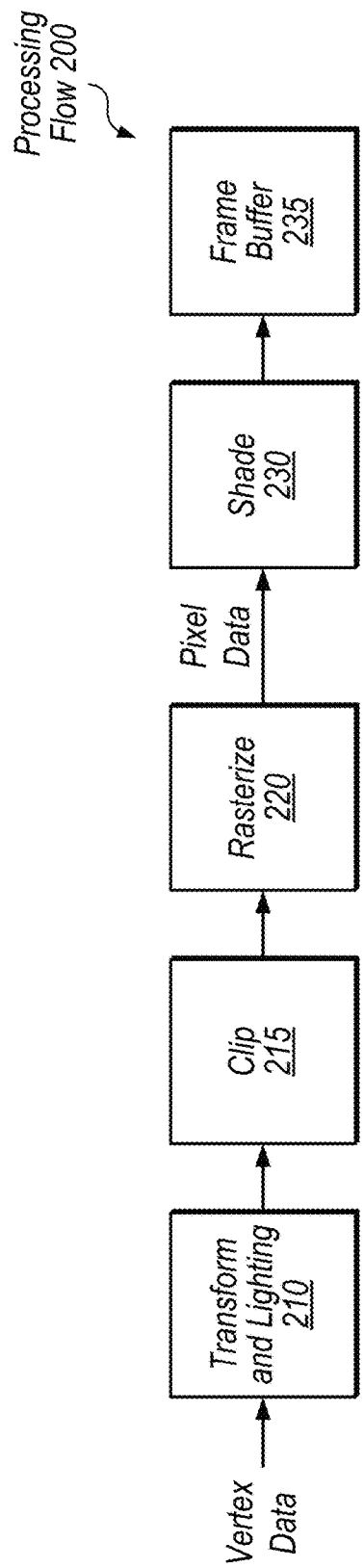
FIG. 2A is a block diagram illustrating an exemplary graphics processing flow.
Figure 2B:
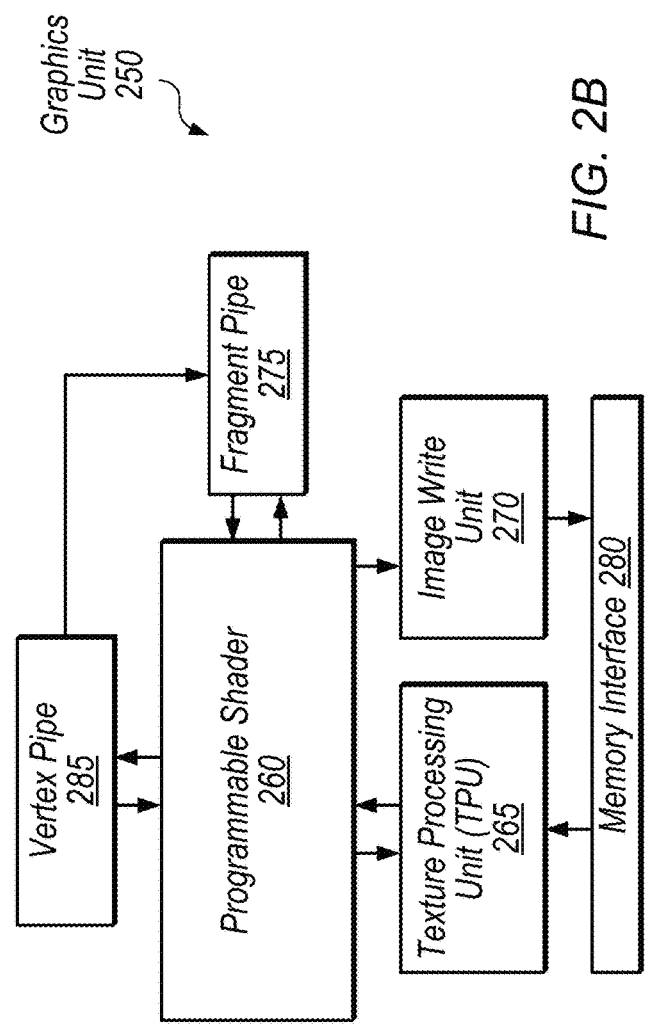
FIG. 2B is a block diagram illustrating one embodiment of a graphics unit.

Various embodiments in this disclosure describe virtual, second, and display spaces with respect to 1D, 2D, and 3D spaces, but virtual space 110, second space 120, and display space 130 may include any number of dimensions that contain graphics primitives and relevant data describing characteristics of graphics primitives (e.g., texture, depth, lighting, opacity, etc.). Performing various graphics rendering processes in a second space may have the advantage of improving performance, reducing power consumption in a graphics unit, improving image quality as displayed to a user, and/or reducing bandwidth usage or latency of video content on a network. FIGS. 2A-2B introduce an overview of a graphics rendering process and an exemplary graphics unit in a more general context, while the remaining figures providing additional details regarding exemplary warp space rendering techniques.

Graphics Processing Overview

Referring to FIG. 2A, a flow diagram illustrating an exemplary processing flow 200 for processing graphics data is shown. In one embodiment, transform and lighting step 210 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 215 may involve discarding polygons or vertices that fall outside of a viewable area. Rasterize step 220 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 230 may involve altering pixel components based on lighting, shadows, bump mapping, translucency, etc. Shaded pixels may be assembled in a frame buffer 235. Modern GPUs typically include programmable shaders that allow customization of shading and other processing steps by application developers. Thus, in various embodiments, the exemplary steps of FIG. 2A may be performed in various orders, performed in parallel, or omitted. Additional processing steps may also be implemented. A transformation step, not shown in FIG. 2A but discussed herein with respect to various embodiments, may be included in processing flow 200 prior to rasterization. The transformation step may involve transforming vertex coordinates into a new coordinate system and modifying vertex data in a manner that reduces the quantity of fragments rasterized in rasterize step 220.

Referring now to FIG. 2B, a simplified block diagram illustrating one embodiment of a graphics unit 250 is shown. In the illustrated embodiment, graphics unit 250 includes programmable shader 260, vertex pipe 285, fragment pipe 275, texture processing unit (TPU) 265, image write unit 270, and memory interface 280. In some embodiments, graphics unit 250 is configured to process both vertex and fragment data using programmable shader 260, which may be configured to process graphics data in parallel using multiple execution pipelines or instances.

Vertex pipe 285, in the illustrated embodiment, may include various fixed-function hardware configured to process vertex data. Vertex pipe 285 may be configured to communicate with programmable shader 260 in order to coordinate vertex processing. In the illustrated embodiment, vertex pipe 285 is configured to send processed data to fragment pipe 275 and/or programmable shader 260 for further processing.

Fragment pipe 275, in the illustrated embodiment, may include various fixed-function hardware configured to process pixel data. Fragment pipe 275 may be configured to communicate with programmable shader 260 in order to coordinate fragment processing. Fragment pipe 275 may be configured to perform rasterization on polygons from vertex pipe 285 and/or programmable shader 260 to generate fragment data. Vertex pipe 285 and/or fragment pipe 275 may be coupled to memory interface 280 (coupling not shown) in order to access graphics data.

Programmable shader 260, in the illustrated embodiment, is configured to receive vertex data from vertex pipe 285 and fragment data from fragment pipe 275 and/or TPU 265. Programmable shader 260 may be configured to perform vertex processing tasks on vertex data which may include various transformations and/or adjustments of vertex data. Programmable shader 260, in the illustrated embodiment, is also configured to perform fragment processing tasks on pixel data such as texturing and shading, for example. Programmable shader 260 may include multiple execution instances for processing data in parallel.

TPU 265, in the illustrated embodiment, is configured to schedule fragment processing tasks from programmable shader 260. In some embodiments, TPU 265 is configured to pre-fetch texture data and assign initial colors to fragments for further processing by programmable shader 260 (e.g., via memory interface 280). TPU 265 may be configured to provide fragment components in normalized integer formats or floating-point formats, for example. In some embodiments, TPU 265 is configured to provide fragments in groups of four (a "fragment quad") in a 2×2 format to be processed by a group of four execution pipelines in programmable shader 260.

Image write unit (IWU) 270, in some embodiments, is configured to store processed tiles of an image and may perform operations to a rendered image before it is transferred for display or to memory for storage. In some embodiments, graphics unit 250 is configured to perform tile-based rendering. In tile-based rendering, different portions of the screen space (e.g., squares or rectangles of pixels) may be processed separately. Memory interface 280 may facilitate communications with one or more of various memory hierarchies in various embodiments.

In various embodiments, a programmable shader such as programmable shader 260 may be coupled in any of various appropriate configurations to other programmable and/or fixed-function elements in a graphics unit. The exemplary embodiment of FIG. 2B shows one possible configuration of a graphics unit 250 for illustrative purposes.

Fragment Pipe Overview

Figure 3:
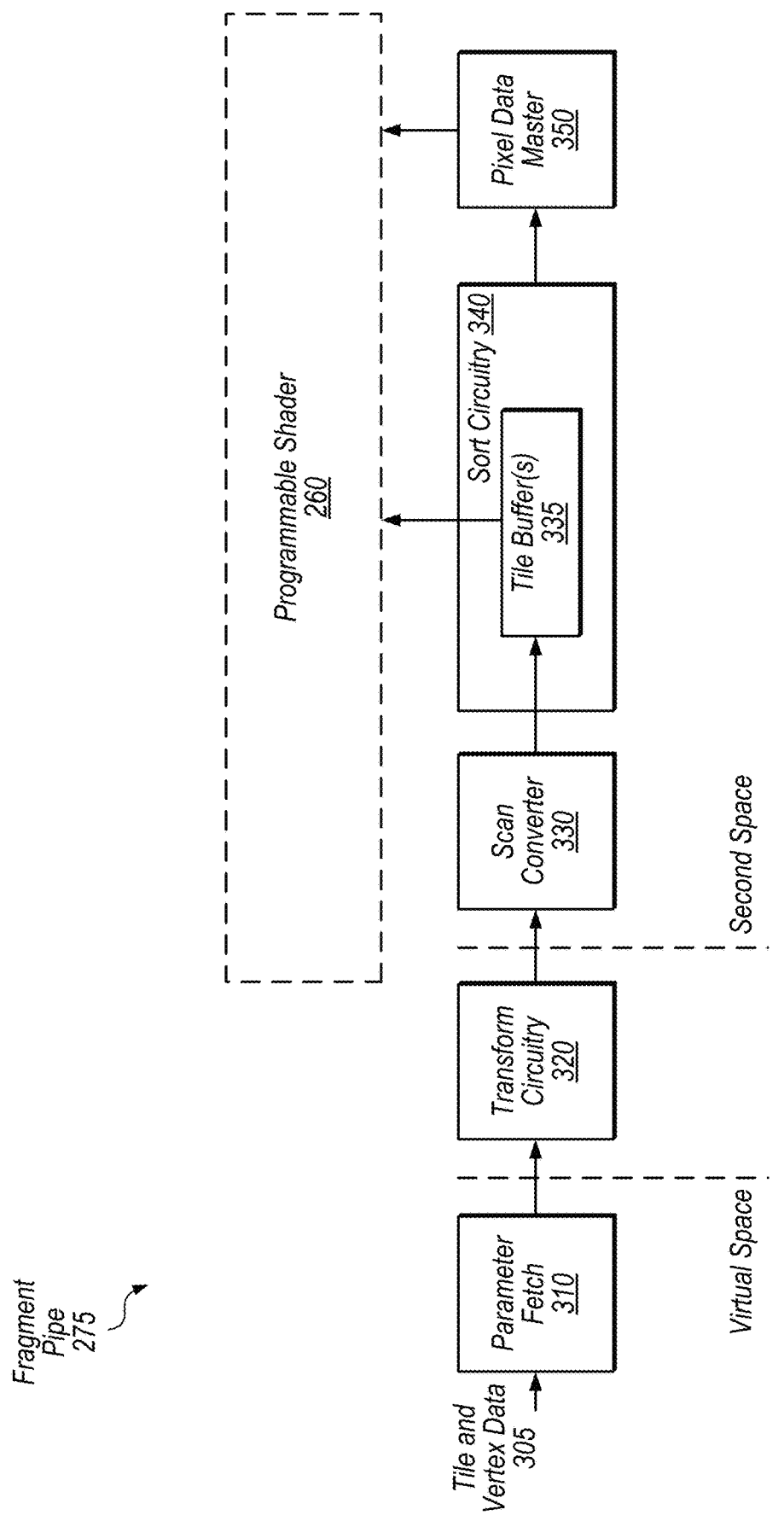
FIG. 3 is a block diagram illustrating an exemplary pipeline that includes transformation and rasterization stages, according to some embodiments.

FIG. 3 is a block diagram illustrating an exemplary fragment pipe 275, according to some embodiments. In the illustrated embodiment, fragment pipe 275 includes parameter fetch circuitry 310, transform circuitry 320, scan converter 330, sort circuitry 340, and pixel data master 350. In the illustrated embodiment, various elements of fragment pipe 275 are configured to communicate with programmable shader 260.

Parameter fetch circuitry 310, in the illustrated embodiment, is configured to receive tile and vertex data 305 for the current tile being processed. This may be obtained via one or more elements of a graphics memory hierarchy, for example, which may contain various cache levels, shared memory structures, etc. The vertex data may specify coordinates of vertices for each primitive in a list of primitives that intersects with the tile being processed. Vertex data for graphics primitives may include data describing visual or other characteristics of a primitive (e.g. texture, lighting, opacity, etc.). Data 305 may also contain various information associating vertex information with the tile being processed and/or describing the tile being processed.

Transform circuitry 320, in the illustrated embodiment, is configured to transform vertex data from a virtual space into a second space. The vertex data may specify coordinates of vertices, and after processing in transform circuitry 320, coordinates of vertices in the second space may be different than coordinates of vertices in the virtual space. In some embodiments, transform circuitry 320 may be implemented in other locations in graphics unit 250 (e.g. vertex pipe 285), in which case parameter fetch circuitry 310 in fragment pipe 275 would receive tile and vertex data 305 associated with a second space (i.e. transformed). In some embodiments, transform circuitry 320 transforms vertex data prior to scan converter 330 rasterizing vertex data to generate fragment data (e.g. prior to rasterize step 220 in FIG. 2A). This may improve performance by reducing processing complexity (e.g. the number of pixels rasterized) for tiles that otherwise may have been oversampled in the virtual space.

In some embodiments, transform circuitry 320 is configured to use different transformation parameters for different tiles, and the parameters may be specified on a per-tile basis by a graphics program or using default values.

Scan converter 330, in the illustrated embodiment, is configured to perform rasterization to generate fragment data based on the vertex data. The term "fragment" is intended to be construed according to its well-understood meaning and fragment data may specify data needed to shade a pixel based on a given primitive (e.g., a reference to one or more shader programs to be executed by programmable shader 260 for the fragment, coordinates for the fragment, etc.), plus data needed to test whether the fragment survives to contribute to attributes of a corresponding pixel (depth, alpha, stencil, scissor, window ID, etc.). In some rendering modes, fragment data may include data for multiple samples per fragment/pixel. The fragment data may be specified at one or more of various levels of granularity (e.g., fragment data may be stored per-sample or may be aggregated per-fragment, per-object, per-tile, etc.). In some embodiments, data from multiple fragments may be used to determine attributes of a particular pixel, e.g., when one fragment is partially transparent.

Sort circuitry 340, in the illustrated embodiment, includes one or more tile buffer(s) 335 and is configured to track which fragments are currently visible until they are shaded. For example, data for a fragment that is covered by an opaque object that is nearer to the screen in a scene being rendered may be discarded from a tile buffer 335 because it is determined not to be visible. These occlusion techniques may reduce the processing required by programmable shader 160, in various embodiments. In some embodiments, sort circuitry 340 includes a separate tile buffer for each tile being processed, which may allow rendering of multiple tiles in parallel. Further, multiple instances of fragment pipe 275 may be included in a given graphics unit, further increasing resources for parallel processing. As used herein, "occlusion" of fragment data refers to a situation where it is determined that the fragment data will not actually contribute to pixel attributes in a frame of graphics data. For example, occlusion occurs when the fragment data is for an object that is behind another object in the scene being rendered and the other object is opaque.

Pixel data master 350, in the illustrated embodiment, is configured to send shader work to programmable shader 260, e.g., in order to shade contents of tile buffer(s) 335. Pixel data master 340 may be configured to flush all or a portion of the contents of a tile buffer 335 for shading, in some embodiments, in response to various events. In some embodiments, graphics unit 250 includes multiple data masters, which may include a vertex data master configured to send vertex work to programmable shader 260 and a compute data master configured to send compute work to programmable shader 260. In some embodiments, programmable shader 260 includes scheduling circuitry configured to allocate hardware resource in programmable shader 260 for work from the various data masters.

Exemplary Transformation from a Virtual Space to a Second Space

Figure 4:
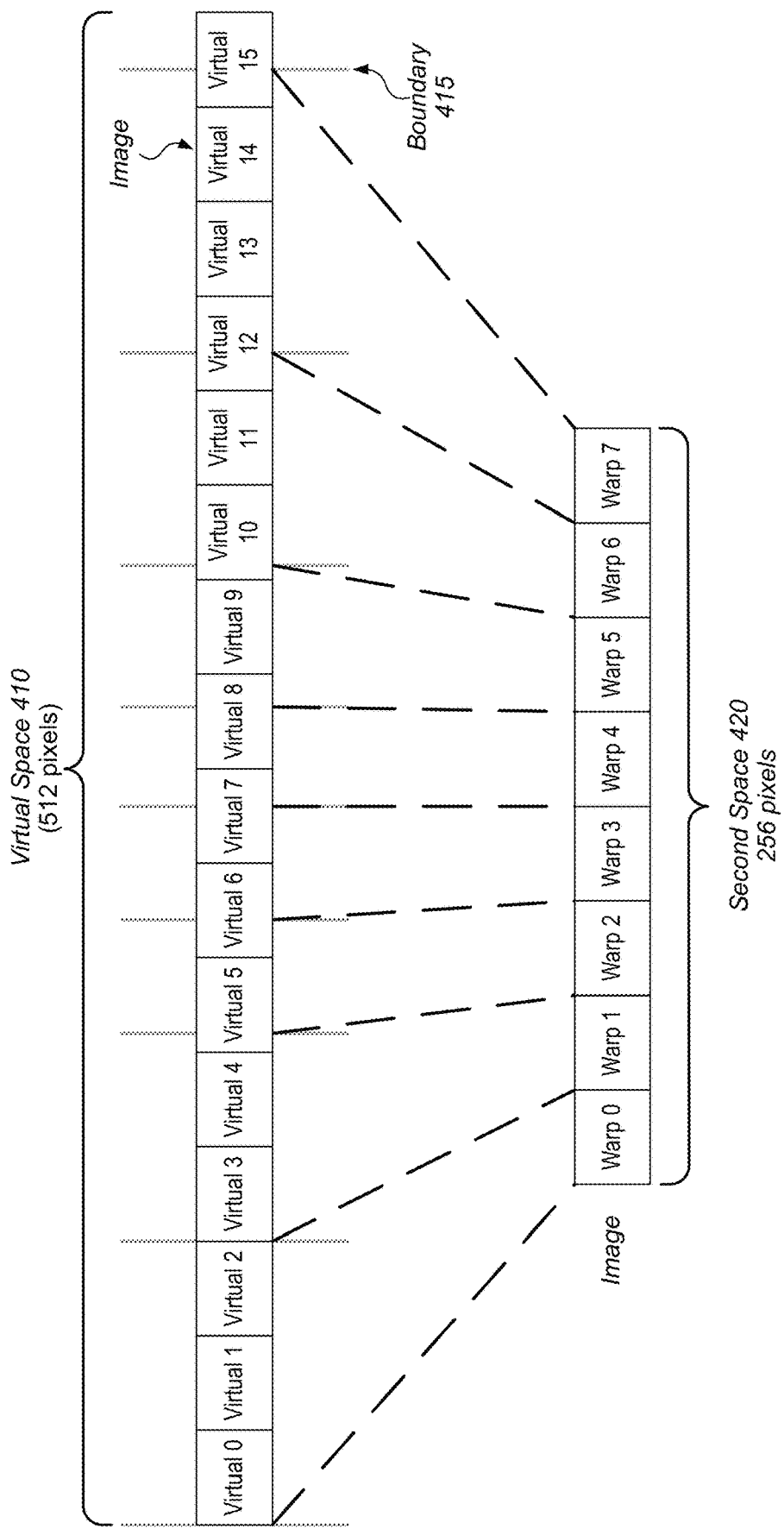
FIG. 4 is a diagram illustrating an exemplary transform of coordinates in a virtual space into coordinates in a second space, according to some embodiments.

FIG. 4 is a diagram illustrating an exemplary 1-D transform of a virtual space image into a second space image, according to some embodiments. FIG. 4 represents an exemplary scenario where using different transformation parameters for different portions of a second space may be useful. The disclosed techniques are in no way limited to such scenarios, however, and various types of transformation functions may be implemented in various embodiments.

In some embodiments, virtual space 110 is a post-vertex-transform space. For example, virtual space 110 may contain vertex data derived from a 3-D model received by a graphics unit from a program or process. In the illustrated embodiment, different transformation parameters are used for different portions of the second space. For example, a 3-to-1 scale factor transforms portions Virtual 0 through Virtual 2 to portion Warp 0, whereas a 1-to-1 scale factor transforms part of Virtual 7 and part of Virtual 8 to Warp 4 such that there are three times less fragments/pixels per virtual portion in Warp 0 than per virtual portion in Warp 4.

In the illustrated embodiment, the size of the overall image is reduced by a factor of two in one dimension (virtual space 410 contains an image that consists of 512 pixels after rasterization, and second space 420 contains an image that consists of 256 pixels after rasterization). In some embodiments, the transformation of coordinates of primitives in virtual space to coordinates of primitives in second space may occur prior to rasterization such that transformation changes vertex coordinates of primitives that are later rasterized.

In some embodiments, multiple or partial portions of virtual space may transform into a single portion of second space. As an example, in the illustrated embodiment, multiple virtual space portions (Virtual 0 through Virtual 2) transform into a single second portion (Warp 0), and parts of different virtual space portions (Virtual 7 and Virtual 8) transform into a single second portion (Warp 4).

In some embodiments, a primitive lying across a boundary separating virtual space portions may fall entirely within a single portion of a second space (e.g., a primitive lying across the boundary of Virtual 1 and Virtual 2 in FIG. 4 falls entirely within Warp 0). In some embodiments, a primitive falling entirely within a single portion of a virtual space may cross a boundary separating second space portions after transformation (e.g. a primitive falling within Virtual 5 in FIG. 4 may cross the boundary between Warp 1 and Warp 2 after transformation).

In some embodiments, not all portions of virtual space 410, or all primitives in virtual space 410, are transformed into second space 420. In the illustrated embodiment, the graphics unit does not transform a primitive located outside boundary 415 in portion Virtual 15 into Warp 7. Similarly, only part of a primitive may be transformed into second space 420 (e.g., for primitives containing vertices on both sides of boundary 415). In some embodiments, the graphics rendering process may include a culling or clipping step after transform into second space 420. As used herein, "cull" is used according to its well-understood meaning in the art, which includes omitting a primitive from graphics processing steps. As used herein, "clip" is used according to its well-understood meaning in the art, which includes removing or reordering data from a primitive to create a new primitive. In some embodiments, the graphics unit may perform a small-object cull after transformation (in addition to culling primitives outside a viewable area), in which it removes transformed primitives that are sufficiently small from the scene. To avoid unnecessary transformation of primitives, the graphics unit may cull primitives prior to transforming vertex data from virtual space 410 into second space 420. The graphics unit may clip primitives before or after transforming vertex data from virtual space 410 into second space 420.

Exemplary Data Structures for Storing Transformation Parameters

FIG. 5 is a diagram illustrating data structures containing different transformation parameters for different portions of a second space, according to some embodiments. In some embodiments, these data structures are implemented using dedicated hardware registers. In the illustrated embodiment, data structure 500 contains tables 510A-510Z. Tables 510A-510Z in the illustrated embodiment contain transformation parameters. As shown, table 510A contains a first set of transformation parameters associated with a first portion (e.g., tile) of a second space (e.g., a warp space), and table 510Z contains a second set of transformation parameters associated with a second portion of a second space.

In some embodiments, transformation parameters may specify inputs to a function that transforms sets of coordinates in the virtual space to respective sets of coordinates in the second space (e.g. coefficients of an equation). In some embodiments, transformation parameters may specify the type of function that transforms sets of coordinates in the virtual space to respective sets of coordinates in the second space (e.g. a linear or quadratic function). The graphics unit may use any number of transformation parameters to specify different functions in some embodiments. Another example of a transformation parameter is a rotation value, which may facilitate full projective transformations, in some embodiments. More generally, projective transforms may utilize matrices, e.g., a 3×3 matrix for a two-dimensional projective transform. As another example, a negative scale factor may be applied such that primitives in virtual space are not only scaled, but also mirrored during transformation into the second space. As another example, a graphics unit may map individual samples/pixels/quads in a portion of a virtual space to different locations in the second space using a projective transformation. Transformation parameters for portions of second space may be programmable, in various embodiments. In some embodiments, transformation parameters may be programmed directly based on user input or instructions in graphics program directly specifying transformation parameters. In some embodiments, transformation parameters may be programmed based on more general criteria specified by a user or graphics program.

In various embodiments, different tables 510A-510Z are used to separately specify transformation parameters for different portions of a second space. In some embodiments, data structure 500 may utilize more or less unique tables containing transformation parameters based on the number of portions in a second space requiring unique transformations. In some embodiments, the portions of the second space may be the same size. For example, each portion of a second space may be a square tile of 32 pixels×32 pixels. In other embodiments, different portions of a second space may be different sizes. For example, a portion near the center of an image may contain 8 pixels×8 pixels, and a portion near the edge of an image may contain 64 pixels×64 pixels. In some embodiments, portions may be various non-square shapes. For example, one or more portions of a second space may contain 16 pixels×32 pixels. Different portion sizes and/or shapes may be used in different embodiments. Portions of a second space may be labeled according to a number of graphics processing nomenclatures (e.g. tiles, slices, blocks, sub-tiles, sub-slices, sub-blocks).

In some embodiments, one or more tables may be associated with more than one portion of a second space. For example, in a second space divided into 64 square tiles, one set of transformation parameters in table 510A may apply to 16 tiles, and another, different set of transformation parameters in table 510Z may apply to 4 tiles. In some embodiments, one or more tables may be associated with a single portion of a second space. In some embodiments, graphics unit 150 is configured to store metadata indicating which table(s) store transformation parameters for which tile(s).

In the illustrated embodiment, data structure 500 include scale factors and offsets for use as transformation parameters. For example, in the illustrated embodiment, the x1 dimension in table 510A specifies a scale factor of 2 and an offset of 0.5. In the illustrated embodiment, the scale factor of 2 may result in half the sampling rate of the virtual space (relative to the sampling before transformation), and the offset of 0.5 may indicate where to start sampling in the virtual space. In some embodiments, transformation parameters may include an offset to achieve a piecewise continuous function across multiple portions of the second space. In some embodiments, offsets for various portions of the second space may be defined with reference to a common reference point. In some embodiments, scale factors and offsets (or any other function used as a transformation parameter) may be defined with reference to pixel content after rasterization. In other embodiments, scale factors and offsets (or any other function used as a transformation parameter) may be defined with reference to a coordinate system. In some embodiments, the coordinate system may be the same coordinate system that defines coordinates for vertices of various primitives.

Data structure 500 may contain different sets of transformation parameters for different dimensions of a second space in some embodiments. As an example, data structure 500 may specify different transformation parameters for the left eye and right eye of a user. In the illustrated embodiment, table 510A contains different scale factors and offsets for each of an x1, x2, and y dimension in a portion of a second space. The transformation parameters for the x1 dimension may apply to the left eye, and the transformation parameters for the x2 dimension may apply to the right eye. Techniques specifying different transformation parameters for different dimensions may provide advantages in stereoscopic or layered rendering or in performing multiple rendering passes generally to achieve certain effects in a rendered graphics frame. In some embodiments, data structure 500 may contain different transformation parameters for different data associated with a second space (e.g., other than vertex coordinates). For example, transformation parameters may be used to process opacity or texture data differently for different tiles.

In some embodiments, data structure 500 may contain transformation parameters that are used for multiple images or frames in a second space. For example, data structure 500 may contain transformation parameters for multiple frames in a second space such that a graphics unit can transform video content into a second space without updating the transformation parameters in data structure 500. In other embodiments, data structure 500 may contain transformation parameters for a single instance of an image or frame in a second space (e.g., the parameters may be updated between processing different frames of video data). In some embodiments, one or more processors may write to data structure 500 to update transformation parameters based on use conditions (e.g., user location, display type) or content or characteristics of a scene (e.g., camera or light location). For example, a graphics unit may update transformation parameters in data structure 500 as it receives information about a user's gaze direction such that a second space maintains a high resolution in areas of the image receiving the most attention from the user. In some embodiments, a graphics unit may update transformation parameters in data structure 500 to achieve greater or lesser resolution in certain areas of the second space as scene content changes. As another example, a graphics unit may update transformation parameters in data structure 500 as the camera location in a scene changes such that different portions of the image become nearer or farther from the camera.

In some embodiments, data structure 500 may be programmable by a graphics program to specify different transformation parameters for different portions of a second space. In some embodiments, data structure 500 may be implemented as one or more elements of a graphics memory hierarchy which may contain various cache levels, shared memory structures, etc.

Exemplary Effects of Transformation on Sampling Rate

Figure 6:
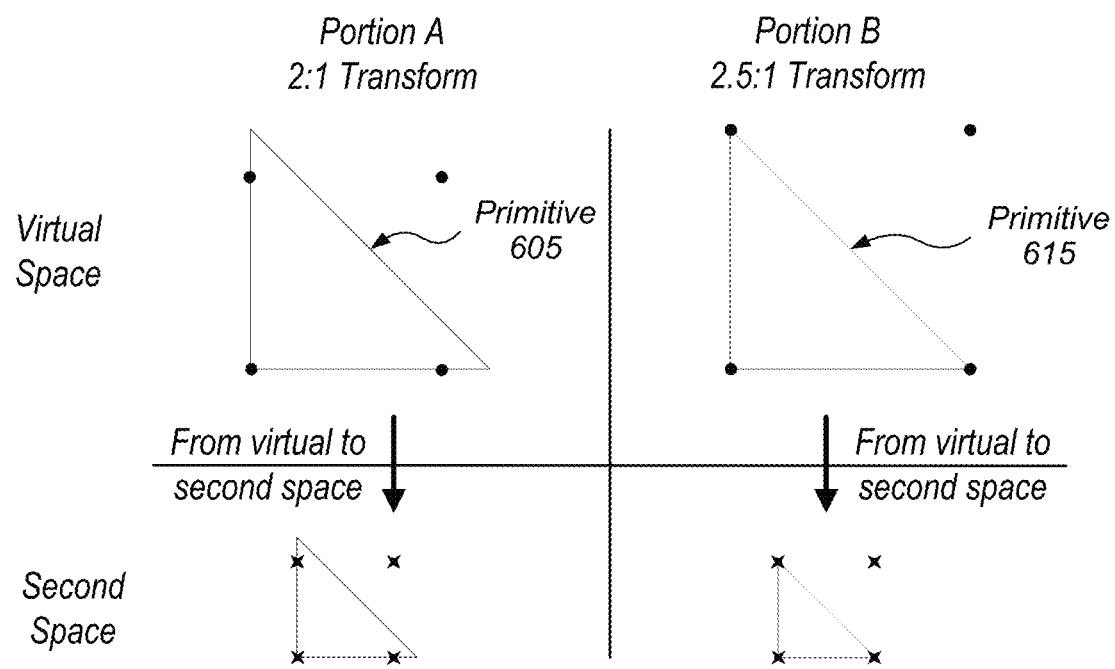
FIG. 6 is a diagram illustrating an exemplary situation in which transformation results in different sampling rates for different portions of a virtual space, according to some embodiments.

FIG. 6 is a diagram illustrating different sampling rates for different portions of a virtual space that may be caused by different transformation parameters for different portions of the second space, according to some embodiments. In the illustrated embodiment, exemplary identical primitives 605 and 615 have the same size in a virtual space but are located in different portions (A and B, respectively) of a second space after translation. During translation from the virtual space into the second space, in the illustrated embodiment, a graphics unit applies different translation parameters to primitive 605 and primitive 615 based on their being mapped to different portions of the second space. As shown, the translation scales primitive 605 by a factor of 2 and primitive 615 by a factor of 2.5.

In the illustrated embodiment, the fragment coordinates shown in the second space correspond to the sample coordinates shown in the virtual space (thus, the coordinates of sample locations in the virtual space transform to the coordinates of the fragments in the second space). In the illustrated embodiment, primitive 605 is sampled at a higher resolution than primitive 615 because its applied translation parameters use a smaller scale factor. Said another way, the number of fragments in the second space per area of virtual space is greater for the 2:1 translation than for the 2.5:1 translation. As illustrated in FIG. 6, in order to sample portions of the virtual space using different sample rates, primitives that have the same size in virtual space may have different sizes in the second space, which may cause portions of the image to appear warped. In the illustrated embodiment, the fragment data reflects the different sampling rates caused by the translation. In some embodiments, the translation may result in different sample rates in the fragment data in different portions of the virtual space once the translated primitives are rasterized.

In some embodiments, primitives 605 and 615 should be the same size on a display but with different resolutions. In some embodiments, images in the second space may be viewed through a lens that applies different magnification to different portions of the image in a manner that removes distortion introduced by translation. Translation parameters may be programmed in some embodiments based on the lens that will used to view a display of the image (e.g. a wide field-of-view virtual reality display uses a known lens type). In some embodiments, the translation parameters may be programmed to introduce distortion that counteracts distortion introduced by the lens such that the image viewed by the user contains little or no distortion.

In some embodiments, portions of the second space may be resampled before display, e.g., to reduce or eliminate distortion caused by the translation to the second space. In some embodiments, the resampling of the second space into a display space may use different resampling rates for different portions of the second space. The different resampling rates for different portions of the second space may be based on the different translation parameters for different portions of the second space, in some embodiments. Resampling of an image in a second space may, in some embodiments, remove the scaling or distortion introduced by translating an image from virtual space into second space (e.g., such that primitives 605 and 615 in FIG. 6 are the same size after translation and resampling). In some embodiments, the resampled image may have a uniform sampling rate across the entire image. In other embodiments, the resampled image may have different sampling rates in different portions. The performance advantages of rasterizing and shading less pixels in a second space after warp translation may outweigh any performance disadvantages of resampling the second space for display, in some embodiments. Resampling may allow rendering the image in second space using conventional rendering methods (e.g. those discussed in FIG. 2A) and graphics hardware (e.g. that discussed in FIG. 2B) while displaying an image with the same resolution and scene content as the virtual space image, but result in less computation, latency, and/or power consumption by the graphics processor. Said another way, performing warp translation before rasterization may allow shader programs to be written without consideration of the warp techniques, and translation, resampling, and/or lens parameters may be selected without needing to consider the actual shading to be performed.

Transformation and Distortion

Figure 7:
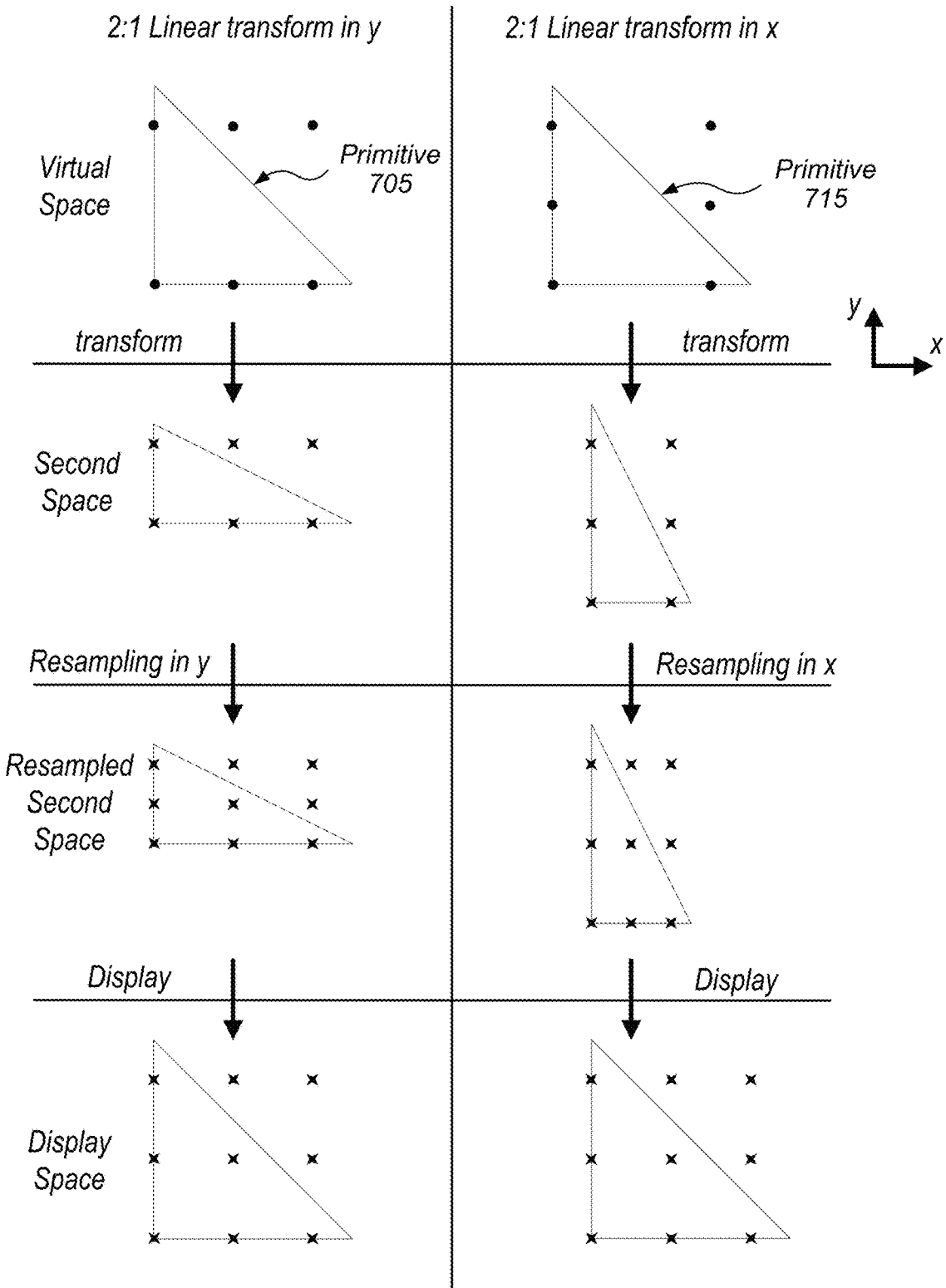
FIG. 7 is a diagram illustrating exemplary distortion resulting from transformation into a second space, as well as resampling a second space into a display space, according to some embodiments.

FIG. 7 is a diagram illustrating distortion resulting from transformation and exemplary corrective resampling (e.g., after shading), according to some embodiments. In the illustrated embodiment, identical primitives 705 and 715 have the same size in a virtual space. During translation into a second space, in the illustrated embodiment, a graphics unit applies a scale factor of 2 to primitive 705 in the y dimension (and a scale factor of 1 in the x dimension) and a scale factor of 2 to primitive 715 in the x dimension (and a scale factor of 1 in the y dimension). In both cases, the image of the primitive in the second space is distorted relative to the original primitive in the virtual space because different scale factors were applied in the x and y dimensions.

As shown, translating coordinates of primitives in the virtual space to coordinates of primitives in the second space may introduce distortion into the image in second space relative to the image in virtual space. The embodiment illustrated in FIG. 7 illustrates linear distortion, but distortion may be introduced by any of various other, nonlinear functions. As discussed above, in some embodiments, a lens may be applied to the translated image in order to remove distortion before display.

In some embodiments, the use of different translation parameters for different dimensions may result in different sampling rates in the virtual space for different dimensions. As illustrated in FIG. 7, primitive 705, which is translated by a scale factor of 2 in the y dimension, is sampled with greater density in the x dimension of virtual space, and primitive 715, which is translated by a scale factor of 2 in the x dimension, is sampled with greater density in the y dimension of virtual space. As discussed above with respect to FIG. 6, translated primitives may be resampled prior to display. In the embodiment illustrated in FIG. 7, for example, translated primitive 705 may be resampled at a rate of 2x in they dimension, and primitive 715 resampled at a rate of 2x in the x dimension. In the illustrated embodiment, translated and resampled primitives 705 and 715 may be displayed at the same resolution such that the translated, resampled primitives are the same size as in the virtual space.

Figure 8A:
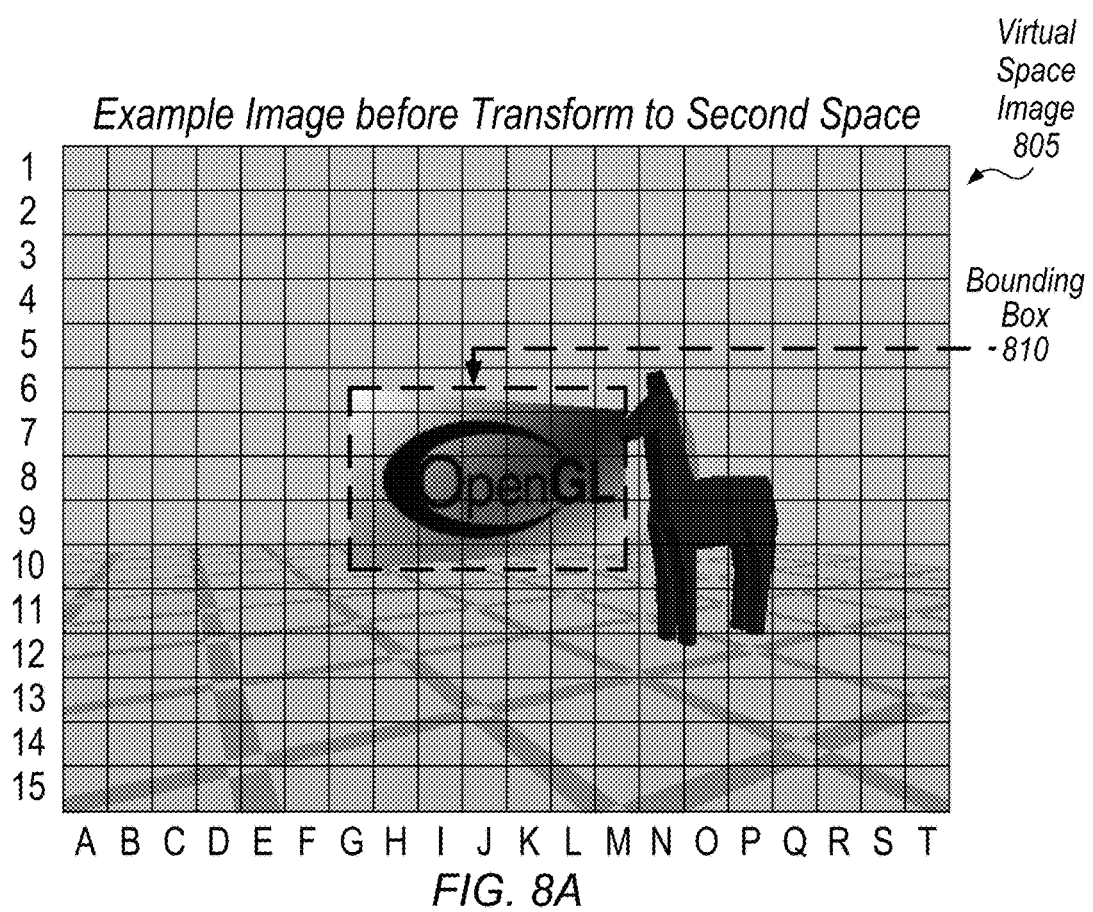
FIG. 8A illustrates an exemplary image in virtual space, including a simplified bounding box, according to some embodiments.
Figure 8B:
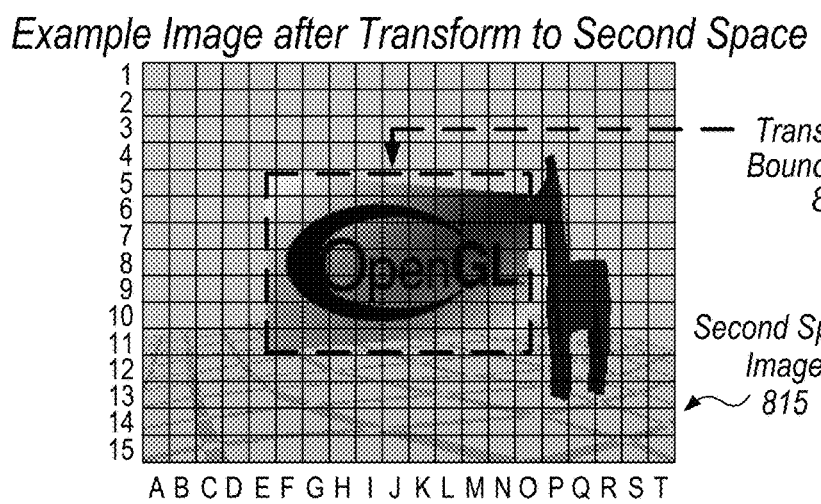
FIG. 8B illustrates an exemplary image in a second space after transformation to the second space, including a simplified bounding box, according to some embodiments.

FIGS. 8A-8B illustrate an exemplary image in a virtual space and in a second space after a warp translation, respectively, according to some embodiments. As shown, the virtual space image 805 contains 15×20 square portions, all of the same size. The second space image 815 in the illustrated embodiment similarly contains 15×20 square portions. In the illustrated embodiment, scene content may shift during the translation from virtual space to second space. For example, note that the horizon, located near the top of row 10 in virtual space 805, shifts to the top of row 11 in second space image 815. Similarly, the "OpenGL" sign, contained in rows 6-10 and columns G-M in the virtual space image 805, expands to rows 5-11 and columns E-O in second space image 815. The total image size of the second space image 805 may be smaller than the total image size of the virtual space image 815. In some embodiments, the translation parameters (e.g., offset and scaling factor) may be used to determine which primitives overlap which tiles in the second space (and thus should be considered for shading of those tiles).

In some embodiments, graphics unit 150 is configured to use "bounding box" techniques to roughly weed out primitives that are known not to intersect a portion (e.g. a tile, in which case the primitive need not be processed for that tile). For example, for triangular primitives, a rectangular bounding box may be used to delineate the furthest points of a primitive in the X and Y dimension. The bounding box may be used to determine which primitives should be considered for each tile, which are then rasterized for the tile after translation. In some embodiments with different translation parameters for different tiles, bounding boxes may need to be translated as well as primitives.

FIGS. 8A-8B also illustrate the concept of a primitive bounding box. Note that these figures using the "OpenGL" sign as an example for purposes of illustration, even though it is not actually a primitive (but rather is represented using many primitives). In the illustrated embodiment, the "Open GL" sign in virtual space image 805 is contained within bounding box 810, and the "Open GL" sign in second space 815 is contained within translated bounding box 820. As shown, applying translation parameters to bounding box 810 results in translated bounding box 820. In some embodiments, graphics unit 150 is configured to separately store translation parameters for bounding box translation and primitive translation.

Therefore, in some embodiments, the graphics unit may determine a bounding box for one or more primitives in the virtual space, then translate coordinates of the bounding box into a second space. A bounding box may bound one primitive or a group of primitives (e.g., as if the "Open GL" sign in FIGS. 8A-8B were a single primitive, or all primitives in the "Open GL" sign were assigned to a common group). In some embodiments, the graphics unit may compare the translated bounding box to one or more portions of the second space to determine which portions of the second space intersect the translated bounding box. The graphics unit may process (e.g., rasterize or translate) one or more primitives contained in the bounding box only for those portions of the second space that intersect the translated bounding box. In some embodiments, a given primitive may be translated using different translation parameters for more than one portion of the second space. For example, the graphics unit would not consider primitives contained in bounding box 820 when translating scene content from virtual image 805 into portions of the second space image 815 lying outside of rows 5-11 and columns E-O, but would consider these primitives when translating scene content into portions of the second space image 815 lying within rows 5-11 and columns E-O. This may advantageously reduce computation by limiting the amount of vertex data processed for each of the portions in the second space.

Exemplary Shadow Mapping Using Per-Tile Transformation Parameters.

In some embodiments, the disclosed warp transformation techniques may be applied to shadow mapping, among various other exemplary applications. As used herein, the term "shadow mapping" is used according to its well-understood meaning in the art, which includes techniques for determining which portions of a scene interacted with a light source (e.g., as opposed to regions where objects block the light source and cause shadows for light from that source). Applying different transformation parameters to different portions of a shadow map may, in some embodiments, use different resolutions for different portions of the shadow map. In some embodiments, transformation parameters may be programmable to sample different portions of a shadow map in virtual space at different resolutions. For example, a light view may be rendered to virtual screen space and shadows nearer a camera may be transformed to warp space at high resolution while shadows far from the camera may be transformed to warp space at low resolution (various techniques may be used for determining transformation parameters for different portions of the warp space, in addition to or in place of location of the camera). This may provide benefits over or improvements in conjunction with conventional shadow mapping methods (e.g. perspective shadow maps, cascaded shadow maps, light space perspective shadow maps, etc.) such as removing the need for multiple shadow maps and/or further reducing shadow aliasing. In some embodiments, different transformation parameters may be used for different light sources.

Additional Equal Angle Rendering Examples

Figure 9A:
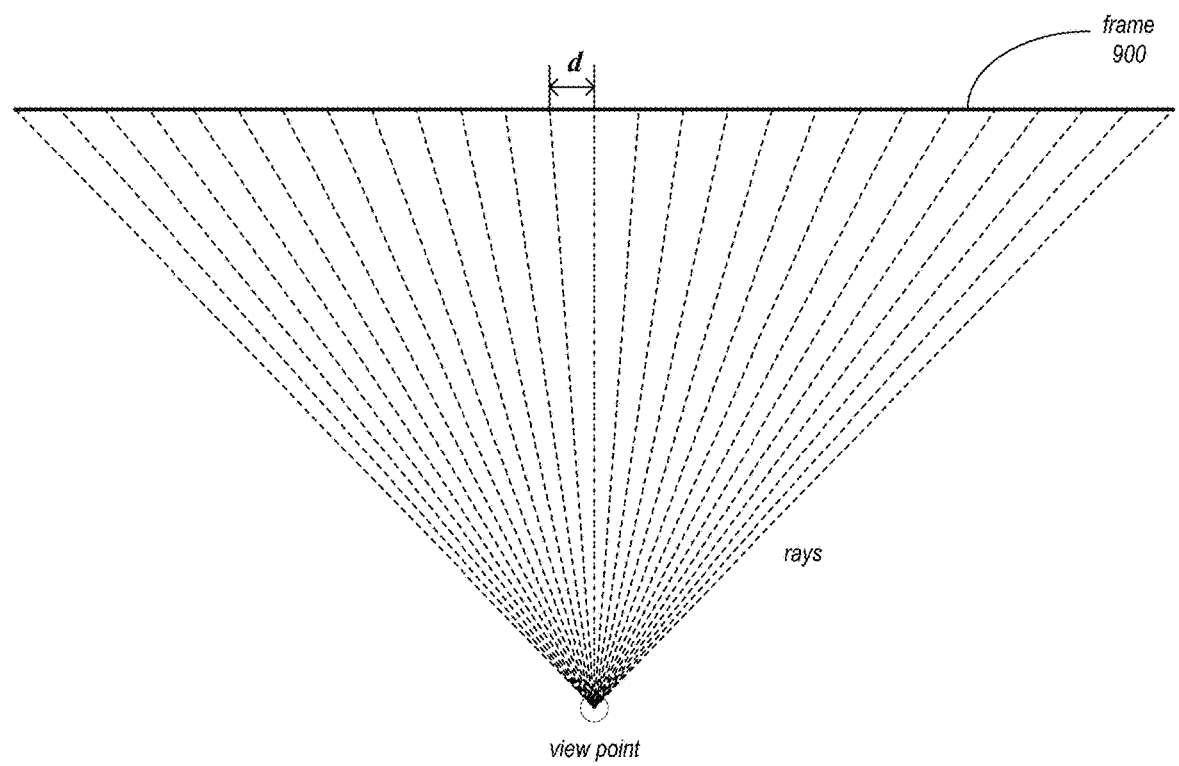
FIGS. 9A through 9D graphically illustrate exemplary equal angle rendering techniques, according to some embodiments.
Figure 9B:
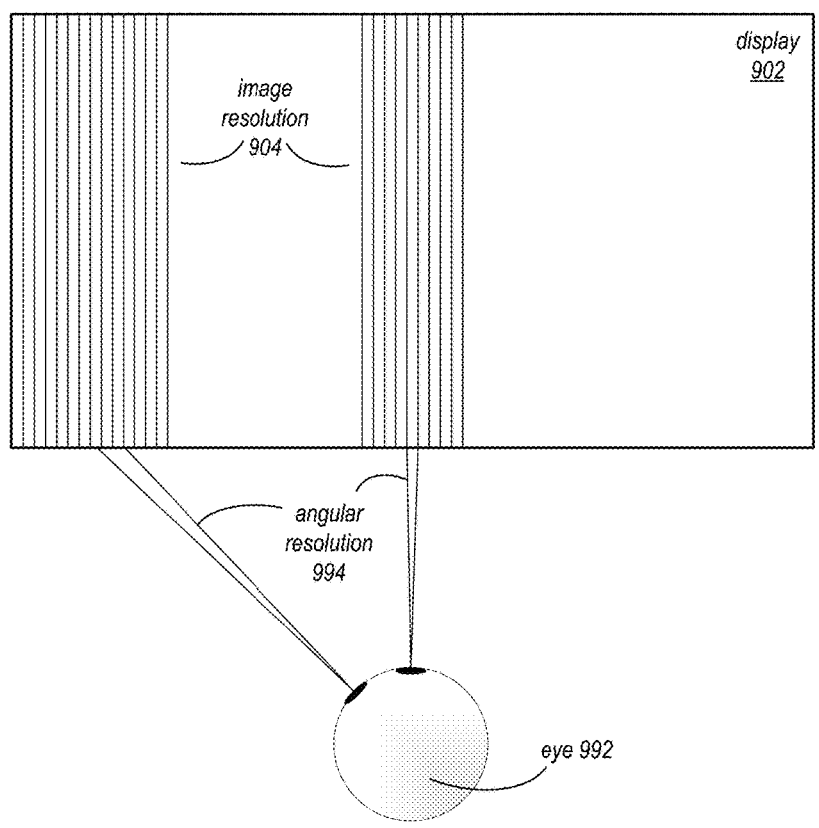
Figure 9C:
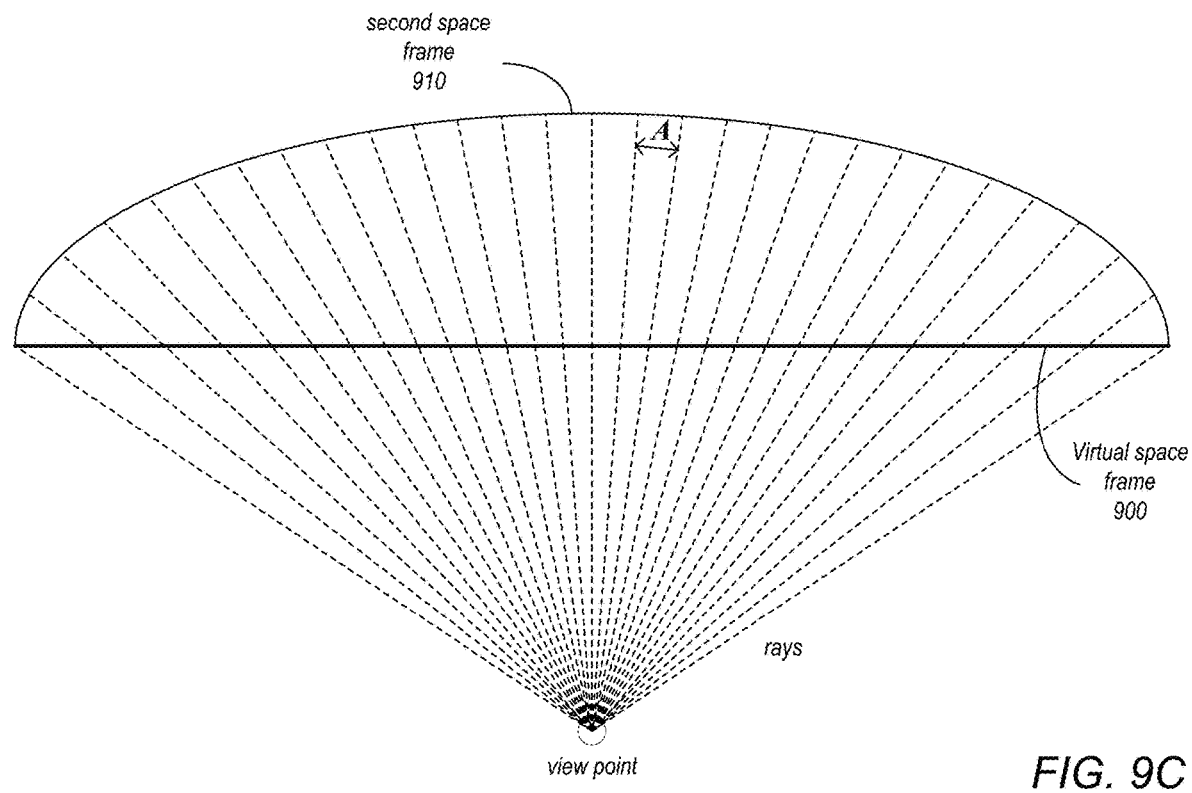
Figure 9D:
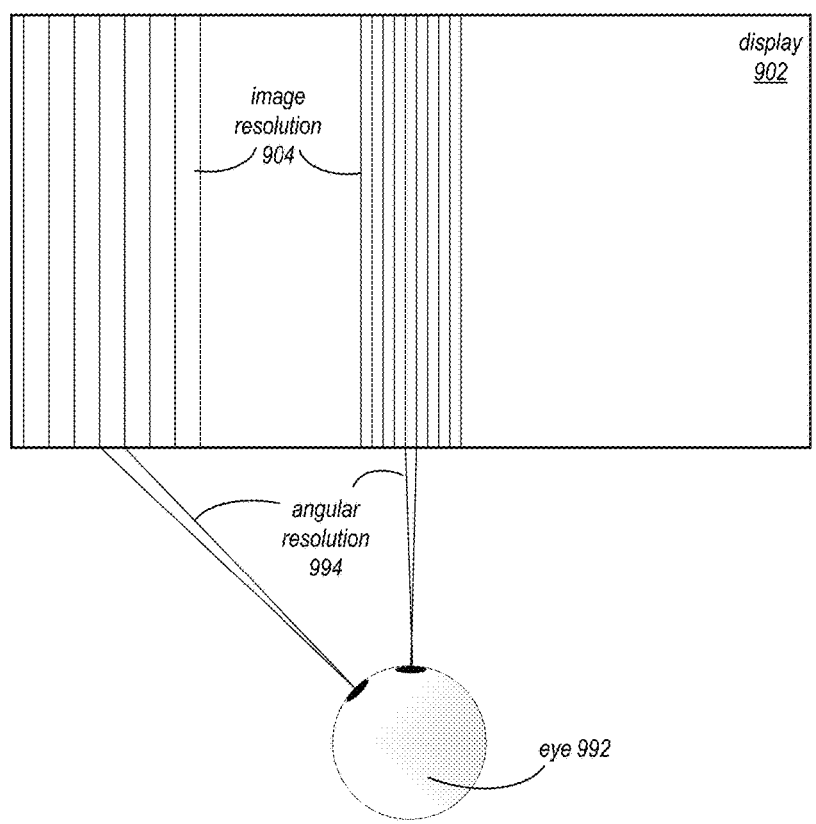

FIGS. 9A through 9D graphically illustrate equal angle rendering, according to some embodiments. In particular, FIGS. 9A and 9B illustrate conventional rectilinear rendering, and FIGS. 9C and 9D illustrate equal angle rendering.

FIG. 9A illustrates firing rays from a view point to sample a frame 900 using a conventional rectilinear projection method. In the rectilinear projection method, rays are fired from a view point into a 3D virtual space at an equal distance d to sample a frame 900. The sampled frame is then rendered by the rendering application to generate an image for display. As shown in FIG. 9B, the rectilinear projection method generates an image with the same resolution 904 across the display 902. Distance d may be selected to provide good detail when the user is looking at the center of the display 902. However, the human eye 992 can only resolve detail at a certain angular resolution 994. As can be seen in FIG. 9B, when the user is looking towards the edges of the display 902, the image resolution is higher than the eye's angular resolution 994. Thus, the rectilinear projection method tends to oversample towards the edges of the image. This is especially true for wide FOV displays.

FIG. 9C illustrates firing rays from a view point to sample a second space frame 910 using an equal angle projection method. In the equal angle projection method, the virtual space frame 900 is translated into a second space frame 910, and rays are fired from a view point into a 3D space at an equal angle A to sample the second space frame 910. In some embodiments, the translation of coordinates for primitives in virtual space frame 900 into second space frame 910 may occur prior to rasterization or sampling. This may have the advantage of reducing computation, increasing rendering speed, and/or reducing power consumption (e.g., by reducing the number of pixels or fragments processed and/or removing the need for resampling by deferring the rasterization process).

In some embodiments, the second space frame 910 is translated into a display space for viewing on display 902. In some embodiments, translation into a display space may occur prior to rasterization. This may advantageously reduce computation by reducing the number of fragments or pixels rasterized. Rays may be fired from a view point into a 3D space at an equal angle A to sample the display space frame or, in other embodiments, the display space frame may be sampled at a uniform rectilinear sample rate. The sampled frame is then rendered by the rendering application to generate an image for display. The equal angle projection method, as shown in FIG. 9D, generates an image with higher resolution at the center of the display 902, and lower resolution towards the edges of the display 902. As can be seen in FIG. 9D, when the user is looking towards the edges of the display 902, because the edges of the display 902 are farther from the pupil of the eye 992 than the center of the display, the lower image resolution at the edges provides similar resolution as is provided at the center of the display 902 and is not oversampled for the eye's angular resolution 994 as in the rectilinear projection method.

The equal angle rendering method reduces the resolution of and thus the time it takes to render a frame, which reduces latency, also reduces the number of bits that need to be transmitted for frames sent over a network or other communications link, which reduces bandwidth usage and latency. Equal angle rendering techniques are one non-limiting example use of the warp translation techniques discussed herein. Similar techniques may be used in multiple dimensions, based on tracking of user's direction of gaze, etc., as discussed in further detail below.

Exemplary Foveated Rendering Techniques

Another technique that may be used in some embodiments may be referred to as foveated rendering, which may be used to reduce the resolution of frames in areas of a frame receiving less attention from a user and thus reduce computation, power consumption, bandwidth usage, and latency. In the foveated rendering method, a graphics unit may use gaze tracking information (e.g. captured in one or more images) from a gaze tracking camera to identify the direction in which the user is currently looking (referred to as the gaze direction). The human eye can perceive higher resolution at the fovea than in the peripheral region of the retina. A region of the frame that corresponds to the fovea (referred to as the foveated region) may be estimated from the determined gaze direction and known parameters (e.g., eye parameters and distance from the eye to the display). The foveated region may be rendered at a higher resolution, while the frame outside the foveated region (referred to as the peripheral region) may be rendered at a lower resolution. In some embodiments, the frame may be transformed into a second space in order to render the foveated and peripheral regions at different sample rates. In some embodiments, different transformation parameters may be applied in the foveated and peripheral region such that the two regions are sampled at different rates (e.g., the foveated and peripheral region contain different portions of the screen that use different transformation parameters, such as those discussed above with respect to FIG. 5). In other embodiments, the peripheral region may be rendered at a higher resolution and later converted to a lower resolution, for example by applying a filter (e.g., a band pass filter) to the peripheral region. The foveated rendering method reduces the number of pixels in the rendered image, which reduces the number of bits that need to be transmitted over a wireless or other network link transmitting frame data and thus reduces bandwidth usage and latency, in some embodiments.

In some embodiments, the disclosed warp space rendering techniques may allow foveated rendering to be performed without altering a shader program. For example, a GPU driver may receive gaze tracking information and implement transformation parameters for different frames based on the gaze tracking information in a manner that is transparent to a shader program. This may allow for performance increases without increasing programming burden for graphics developers.

Exemplary Method

Figure 10:
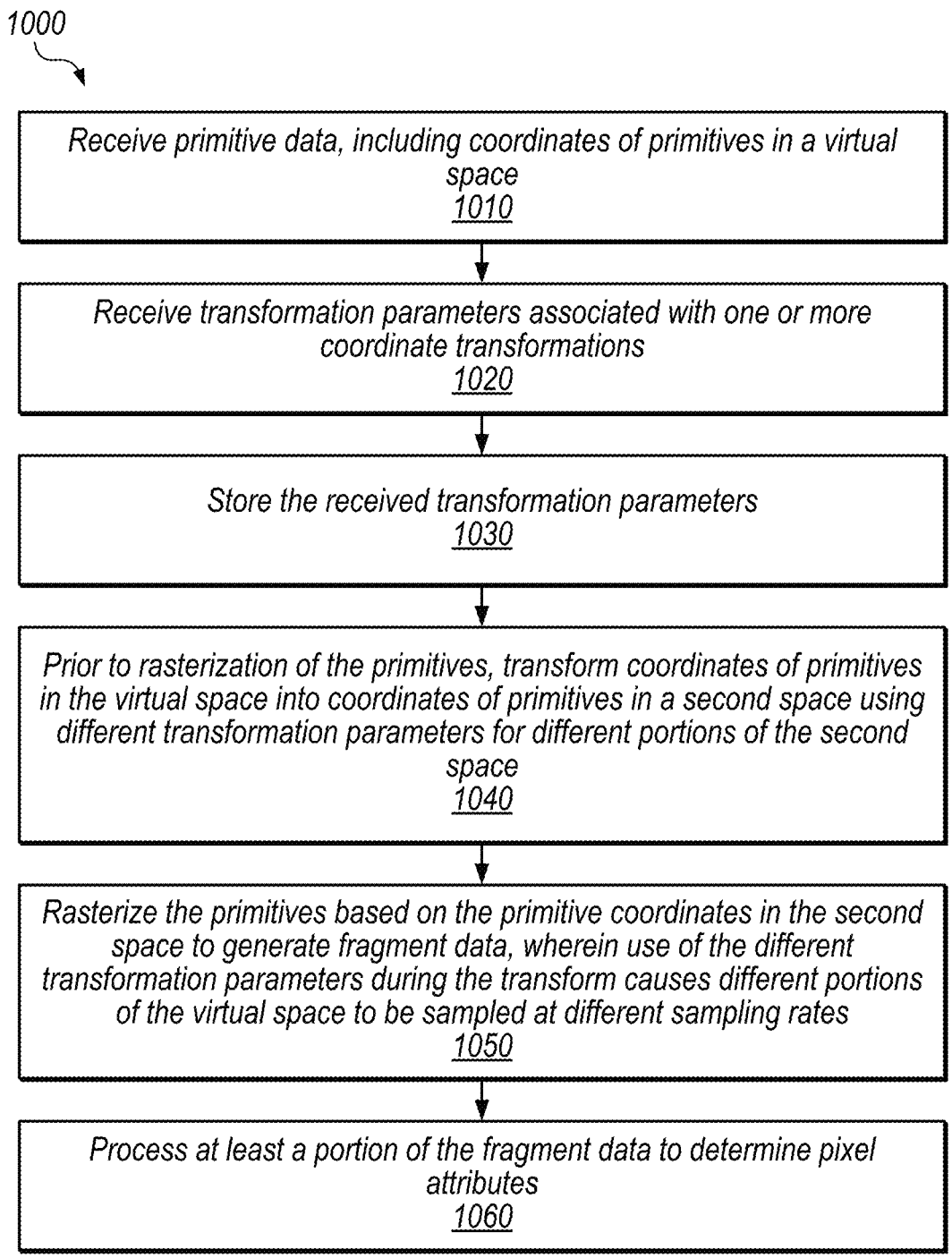
FIG. 10 is a flow diagram illustrating an exemplary method for multi-space rendering, according to some embodiments.

FIG. 10 is a flow diagram illustrating an exemplary method 1000 for multi-space rendering, according to some embodiments. The method shown in FIG. 10 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 1010, in the illustrated embodiment, graphics circuitry (e.g. graphics unit 250) receives primitive data, including coordinates of primitives in a virtual space. In some embodiments, graphics circuitry receives primitive data from a program or process external to the graphics circuitry. In some embodiments, graphics circuitry retrieves primitive data from memory. In some embodiments, the coordinates of primitives in a virtual space are used to determine where the primitives will be rendered in a displayed scene.

At 1020, in the illustrated embodiment, graphics circuitry receives transformation parameters associated with one or more coordinate transformations. In some embodiments, transformation parameters may specify a function that transforms sets of coordinates in a virtual space to respective sets of coordinates in a second space. In some embodiments, the graphics circuitry receives different transformation parameters for different portions of a second space. In some embodiments, transformation parameters may specify scale factors and offsets for use in a coordinate transformation. In some embodiments, the received transformation parameters may be specified to achieve certain criteria (e.g. file size, image resolution, performance benchmarks, etc.).

At 1030, in the illustrated embodiment, graphics circuitry stores the received transformation parameters. For example, a graphics unit may store transformation parameters in data structure 500 and retrieve transformation parameters for use in rendering via memory interface 280. In some embodiments, graphics circuitry may store different transformation parameters for different portions of a second space. In some embodiments, graphics circuitry may store different sets of transformation parameters for different dimensions of a second space. In some embodiments, graphics circuitry may store different sets of transformation parameters for different graphic frames. In some embodiments, graphics circuitry may update the stored transformation parameters in response to changes in the use environment or the graphics data being rendered. For example, graphics circuitry may update transformation parameters based on a change in the camera view in a scene or a change in the gaze direction of a user viewing video content. The stored transformation parameters may be programmable in some embodiments such that graphics circuitry updates the stored transformation parameters in response to receiving information from an external program or process.

At 1040, in the illustrated embodiment, graphics circuitry (e.g. transform circuitry 320), prior to rasterization of the primitives, transforms coordinates of primitives in the virtual space into coordinates of primitives in a second space using different transformation parameters for different portions of the second space. Different portions of the virtual and second spaces may be one or more sizes and shapes. Transformation of primitives into the second space may introduce distortion in the second space image, relative to the virtual space image (e.g. the relative sizes of primitives may change during the transformation). Transforming coordinates of primitives in a virtual space into coordinates of primitives in a second space may include updating vertex data, including vertex coordinates, for one or more primitives, in some embodiments. In some embodiments, the transformation may result in a second space image that is of different size (expressed in pixels or coordinates) than the virtual space image.

At 1050, in the illustrated embodiment, graphics circuitry (e.g. scan converter 330) rasterizes the primitives based on the primitive coordinates in the second space to generate fragment data, where use of the different transformation parameters during the transformation causes different portions of the virtual space to be sampled at different sample rates. The use of different transformation parameters (e.g., a scale parameter) during the transformation from virtual to second space may result in sampling different portions of the virtual space at different sample rates during rasterization. For example, applying the same sampling rate to two portions of a second space—a first portion unscaled from virtual space and a second portion reduced in size by a factor of 2—may result in sampling one portion of a virtual space twice as much as another portion of the virtual space.

At 1060, in the illustrated embodiment, graphics circuitry (e.g. programmable shader 260) processes at least a portion of the fragment data to determine pixel attributes. Pixel/fragment shaders may operate on rasterized data to determine pixel attributes (e.g. color, texture, etc.).

Exemplary Device

Figure 11:
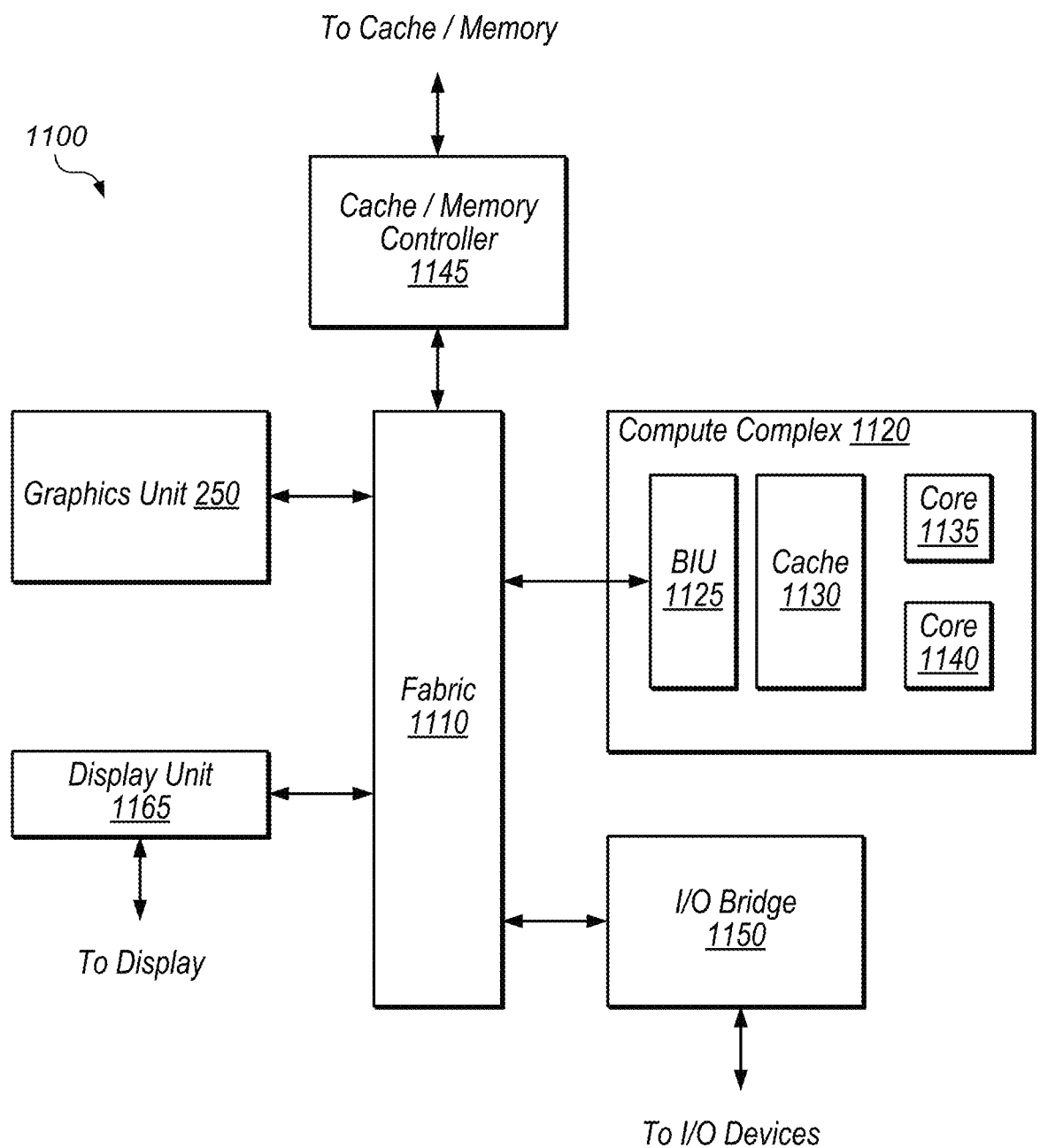
FIG. 11 is a block diagram illustrating one embodiment of a device that includes a graphics unit.

Referring now to FIG. 11, a block diagram illustrating an exemplary embodiment of a device 1100 is shown. In some embodiments, elements of device 1100 may be included within a system on a chip. In some embodiments, device 1100 may be included in a mobile device, which may be battery-powered. Therefore, power consumption by device 1100 may be an important design consideration. In the illustrated embodiment, device 1100 includes fabric 1110, compute complex 1120, input/output (I/O) bridge 1150, cache/memory controller 1145, graphics unit 250, and display unit 1165. In some embodiments, device 1100 may include other components (not shown) in addition to and/or in place of the illustrated components, such as video processor encoders and decoders, image processing or recognition elements, computer vision elements, etc.

Fabric 1110 may include various interconnects, buses, MUX's, controllers, etc., and may be configured to facilitate communication between various elements of device 1100. In some embodiments, portions of fabric 1110 may be configured to implement various different communication protocols. In other embodiments, fabric 1110 may implement a single communication protocol and elements coupled to fabric 1110 may convert from the single communication protocol to other communication protocols internally.

In the illustrated embodiment, compute complex 1120 includes bus interface unit (BIU) 1125, cache 1130, and cores 1135 and 1140. In various embodiments, compute complex 1120 may include various numbers of processors, processor cores and/or caches. For example, compute complex 1120 may include 1, 2, or 4 processor cores, or any other suitable number. In one embodiment, cache 1130 is a set associative L2 cache. In some embodiments, cores 1135 and/or 1140 may include internal instruction and/or data caches. In some embodiments, a coherency unit (not shown) in fabric 1110, cache 1130, or elsewhere in device 1100 may be configured to maintain coherency between various caches of device 1100. BIU 1125 may be configured to manage communication between compute complex 1120 and other elements of device 1100. Processor cores such as cores 1135 and 1140 may be configured to execute instructions of a particular instruction set architecture (ISA) which may include operating system instructions and user application instructions.

Cache/memory controller 1145 may be configured to manage transfer of data between fabric 1110 and one or more caches and/or memories. For example, cache/memory controller 1145 may be coupled to an L3 cache, which may in turn be coupled to a system memory. In other embodiments, cache/memory controller 1145 may be directly coupled to a memory. In some embodiments, cache/memory controller 1145 may include one or more internal caches.

As used herein, the term "coupled to" may indicate one or more connections between elements, and a coupling may include intervening elements. For example, in FIG. 11, graphics unit 250 may be described as "coupled to" a memory through fabric 1110 and cache/memory controller 1145. In contrast, in the illustrated embodiment of FIG. 11, graphics unit 250 is "directly coupled" to fabric 1110 because there are no intervening elements.

Graphics unit 250 may include one or more processors and/or one or more graphics processing units (GPU's). Graphics unit 250 may receive graphics-oriented instructions, such as OPENGL®, Metal, or DIRECT3D® instructions, for example. Graphics unit 250 may execute specialized GPU instructions or perform other operations based on the received graphics-oriented instructions. Graphics unit 250 may generally be configured to process large blocks of data in parallel and may build images in a frame buffer for output to a display. Graphics unit 250 may include transform, lighting, triangle, and/or rendering engines in one or more graphics processing pipelines. Graphics unit 250 may output pixel information for display images. In some embodiments, graphics unit 250 is configured to perform one or more memory consistency, mid-render compute, local image block, and/or pixel resource synchronization techniques.

Display unit 1165 may be configured to read data from a frame buffer and provide a stream of pixel values for display. Display unit 1165 may be configured as a display pipeline in some embodiments. Additionally, display unit 1165 may be configured to blend multiple frames to produce an output frame. Further, display unit 1165 may include one or more interfaces (e.g., MIPI® or embedded display port (eDP)) for coupling to a user display (e.g., a touchscreen or an external display).

I/O bridge 1150 may include various elements configured to implement: universal serial bus (USB) communications, security, audio, and/or low-power always-on functionality, for example. I/O bridge 1150 may also include interfaces such as pulse-width modulation (PWM), general-purpose input/output (GPIO), serial peripheral interface (SPI), and/or inter-integrated circuit (I2C), for example. Various types of peripherals and devices may be coupled to device 1100 via I/O bridge 1150.

In some embodiments, various elements of device 1100 may include clock gaters arranged hierarchically, including various series of DET clock gaters coupled to deliver clock signals to different portions of a clock tree. The disclosed techniques may reduce switching power consumption in device 1100, balance the clock delay to different portions of device 1100, reduce errors in device 1100, achieve higher frequency, achieve required frequency at a lower power supply voltage, reduce energy dissipated per cycle (or per task, per pixel, or per byte, for example), etc.

Exemplary Computer-Readable Media

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 12:
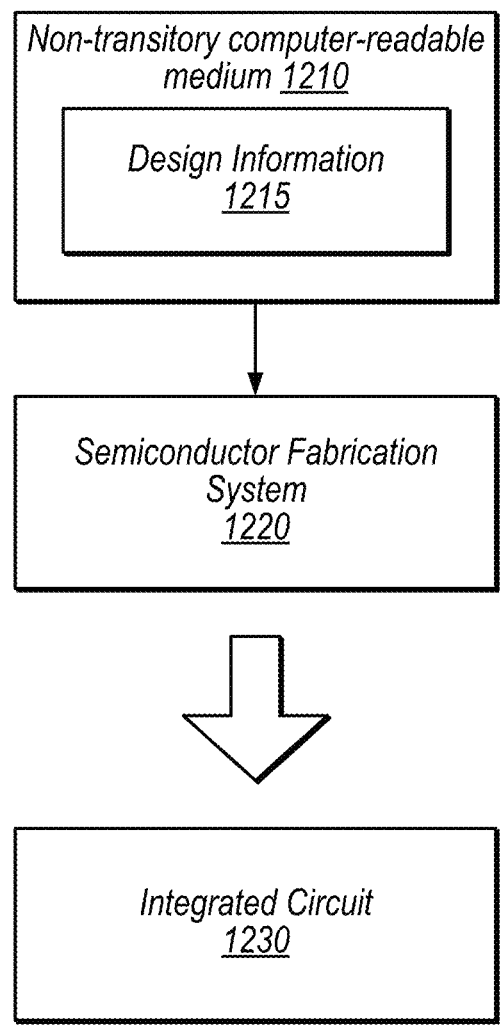
FIG. 12 is a block diagram illustrating an exemplary computer-readable medium, according to some embodiments.

FIG. 12 is a block diagram illustrating an exemplary non-transitory computer-readable storage medium that stores circuit design information, according to some embodiments. In the illustrated embodiment semiconductor fabrication system 1220 is configured to process the design information 1215 stored on non-transitory computer-readable medium 1210 and fabricate integrated circuit 1230 based on the design information 1215.

Non-transitory computer-readable medium 1210, may comprise any of various appropriate types of memory devices or storage devices. Medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 1210 may include other types of non-transitory memory as well or combinations thereof. Medium 1210 may include two or more memory mediums which may reside in different locations, e.g., in different computer systems that are connected over a network.

Design information 1215 may be specified using any of various appropriate computer languages, including hardware description languages such as, without limitation: VHDL, Verilog, SystemC, SystemVerilog, RHDL, M, MyHDL, etc. Design information 1215 may be usable by semiconductor fabrication system 1220 to fabricate at least a portion of integrated circuit 1230. The format of design information 1215 may be recognized by at least one semiconductor fabrication system 1220. In some embodiments, design information 1215 may also include one or more cell libraries which specify the synthesis and/or layout of integrated circuit 1230. In some embodiments, the design information is specified in whole or in part in the form of a netlist that specifies cell library elements and their connectivity. Design information 1215, taken alone, may or may not include sufficient information for fabrication of a corresponding integrated circuit. For example, design information 1215 may specify the circuit elements to be fabricated but not their physical layout. In this case, design information 1215 may need to be combined with layout information to actually fabricate the specified circuitry.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements shown in FIGS. 2B and/or 3. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure has described various exemplary methods in detail above. It is intended that the present disclosure cover not only embodiments that include such operations, but also a computer-readable storage medium containing instructions executable by a computing device to perform the disclosed operations. In some embodiments, a non-transitory computer-readable storage medium contains instructions executable by a computing device to perform operations comprising: receiving primitive data, including coordinates of primitives in a virtual space; receiving transformation parameters associated with one or more coordinate transformations; storing the received transformation parameters; prior to rasterization of the primitives, transforming coordinates of primitives in the virtual space into coordinates of primitives in a second space using different transformation parameters for different portions of the second space; rasterizing the primitives based on the primitive coordinates in the second space to generate fragment data, wherein use of the different transformation parameters during the transformation causes different portions of the virtual space to be sampled at different sample rates; and processing at least a portion of the fragment data to determine pixel attributes.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
graphics circuitry configured to perform tile-based rendering of graphics frames, wherein the graphics circuitry is further configured to:
receive primitive data, including coordinates of primitives in a virtual space;
receive transformation parameters associated with one or more coordinate transformations, wherein the transformation parameters include one or more scale factors and one or more offsets;
store the received transformation parameters;
adjust the stored transformation parameters based on a change in one or more user environment parameters;
prior to rasterization of the primitives, transform coordinates of primitives in the virtual space into coordinates of primitives in a second space based on the stored transformation parameters, including using different transformation parameters for different portions of the second space;
determine a bounding box for a first primitive in the virtual space;
transform coordinates of the bounding box in the virtual space to coordinates of a transformed bounding box in the second space; and
determine which of the portions of the second space intersect with the transformed bounding box;
process the primitive only for one or more portions of the second space that intersect with the transformed bounding box;
rasterize the primitives based on the primitive coordinates in the second space to generate fragment data, wherein use of the different transformation parameters during the transformation causes different portions of the virtual space to be sampled at different sample rates; and
process at least a portion of the fragment data to determine pixel attributes for a graphics frame.

2. The apparatus of claim 1, further comprising:
register circuitry programmable by a graphics program to specify the different transformation parameters for the different portions of the second space.

3. The apparatus of claim 1, further comprising:
resampling circuitry configured to resample, using different resampling rates for the different portions of the second space, the fragment data for display in a display space.

4. The apparatus of claim 1, further comprising:
one or more lenses configured to remove distortion introduced by transformation of the coordinates of primitives in the virtual space to the coordinates of primitives in the second space.

5. The apparatus of claim 1, wherein the transformation parameters specify inputs to a function that transforms sets of coordinates in the virtual space to respective sets of coordinates in the second space.

6. The apparatus of claim 1, wherein the graphics circuitry is further configured to
receive a gaze direction; and
determine one or more transformation parameters based at least in part on the received gaze direction.

7. The apparatus of claim 1, wherein the graphics circuitry is further configured to:
cull primitive data in the second space such that the graphics circuitry does not generate fragment data for primitive data located outside a viewable area.

8. The apparatus of claim 1, wherein the graphics circuitry is further configured to:
transform coordinates of one or more shadow maps in the virtual space to coordinates of one or more shadow maps in the second space, wherein the transformation uses different transformation parameters for different portions of the one or more shadow maps in the second space such that different portions of the one or more shadow maps in the virtual space have a different sample rate.

9. The apparatus of claim 1, wherein the graphics circuitry is further configured to:
specify one or more sets of transformation parameters for one or more graphics frames.

10. The apparatus of claim 1, wherein the graphics circuitry is further configured to:
specify multiple different sets of transformation parameters for a single portion of the second space, wherein the different sets correspond to different dimensions.

11. A method, comprising:
receiving, by a computing system, primitive data, including coordinates of primitives in a virtual space;
receiving, by the computing system, transformation parameters associated with one or more coordinate transformations, wherein the transformation parameters include one or more scale factors and one or more offsets;
storing, by the computing system, the received transformation parameters;
adjusting, by the computing system, the stored transformation parameters based on a change in one or more user environment parameters;
prior to rasterization of the primitives, the computing system transforming coordinates of primitives in the virtual space into coordinates of primitives in a second space based on the stored transformation parameters, using different transformation parameters for different portions of the second space;
determining, by the computing system, a bounding box for a first primitive in the virtual space;
transforming, by the computing system, coordinates of the bounding box in the virtual space to coordinates of a transformed bounding box in the second space; and
determining, by the computing system, which of the portions of the second space intersect with the transformed bounding box;
processing, by the computing system, the primitive only for one or more portions of the second space that intersect with the transformed bounding box rasterizing the primitives based on the primitive coordinates in the second space to generate fragment data, wherein use of the different transformation parameters during the transformation causes different portions of the virtual space to be sampled at different sample rates; and
processing, by the computing system, at least a portion of the fragment data to determine pixel attributes for a graphics frame.

12. The method of claim 11, further comprising:
using different resampling rates for the different portions of the second space, resampling the fragment data for display in a display space.

13. The method of claim 11, further comprising:
receiving a gaze direction; and
determining one or more transformation parameters based at least in part on the received gaze direction.

14. The method of claim 11, wherein the transformation parameters specify inputs to a function that transforms sets of coordinates in the virtual space to respective sets of coordinates in the second space.

15. A non-transitory computer readable storage medium having stored thereon design information that specifies a design of at least a portion of a hardware integrated circuit in a format recognized by a semiconductor fabrication system that is configured to use the design information to produce the circuit according to the design, including:
graphics circuitry configured to perform tile-based rendering of graphics frames, wherein the graphics circuitry is further configured to:
receive primitive data, including coordinates of primitives in a virtual space;
receive transformation parameters associated with one or more coordinate transformations, wherein the transformation parameters include one or more scale factors and one or more offsets;
store the received transformation parameters;
adjust the stored transformation parameters based on a change in one or more user environment parameters;
prior to rasterization of the primitives, transform coordinates of primitives in the virtual space into coordinates of primitives in a second space based on the stored transformation parameters, using different transformation parameters for different portions of the second space;
determine a bounding box for a first primitive in the virtual space;
transform coordinates of the bounding box in the virtual space to coordinates of a transformed bounding box in the second space; and
determine which of the portions of the second space intersect with the transformed bounding box;
process the primitive only for one or more portions of the second space that intersect with the transformed bounding box;
rasterize the primitives based on the primitive coordinates in the second space to generate fragment data, wherein use of the different transformation parameters during the transformation causes different portions of the virtual space to be sampled at different sample rates; and
process at least a portion of the fragment data to determine pixel attributes for a graphics frame.

16. The non-transitory computer readable storage medium of claim 15, wherein the different transformation parameters include one or more rotation factors.

17. The non-transitory computer readable storage medium of claim 15, wherein the design information specifies that the circuit further comprises:
resampling circuitry configured to resample the fragment data for display in a display space.

* * * * *